(12) United States Patent
Daniels et al.

(10) Patent No.: US 6,506,309 B1
(45) Date of Patent: Jan. 14, 2003

(54) OZONE DISSOLVING SYSTEM FOR A RESERVOIR

(75) Inventors: Ralph G. Daniels, Derry; David A. Spofford, Northwood, both of NH (US)

(73) Assignee: Awois, LLC, Auburn, NH (US)

( * ) Notice: Subject to any disclaimer, the term of this patent is extended or adjusted under 35 U.S.C. 154(b) by 55 days.

(21) Appl. No.: 09/714,634

(22) Filed: Nov. 16, 2000

(51) Int. Cl.⁷ .................................................. C02F 1/78
(52) U.S. Cl. ...................... 210/760; 210/765; 210/192; 210/205; 210/252; 210/258
(58) Field of Search ................ 210/760, 765, 210/192, 205, 252, 258

(56) References Cited

U.S. PATENT DOCUMENTS

| | | | |
|---|---|---|---|
| 5,097,556 A | | 3/1992 | Engel et al. |
| 5,181,399 A | | 1/1993 | Engel et al. |
| 5,241,720 A | | 9/1993 | Engel et al. |
| 5,493,743 A | | 2/1996 | Schneider et al. |
| 5,665,228 A | * | 9/1997 | Leaverton |
| 5,806,120 A | | 9/1998 | McEachern |
| 5,824,243 A | * | 10/1998 | Contreras |
| 5,960,501 A | | 10/1999 | Burdick |
| 5,960,649 A | | 10/1999 | Burdick |
| 6,068,778 A | * | 5/2000 | Steiner et al. |
| 6,129,850 A | * | 10/2000 | Martin et al. |

* cited by examiner

*Primary Examiner*—Betsey Morrison Hoey
(74) *Attorney, Agent, or Firm*—Davis & Bujold, P.L.L.C.

(57) ABSTRACT

A system comprising an ozone generator for generating ozone and a venturi for mixing the liquid to be ozonated with the generated ozone. The ozone generator is coupled to an orifice for supplying the generated ozone thereto. A pump is coupled to an outlet of the reservoir for pumping liquid to be ozonated from the reservoir to venturi. An outlet of the venturi is connected to a return inlet of the reservoir for supplying ozonated liquid back to the reservoir. A mixing chamber interconnects the outlet of the venturi to the return inlet of the reservoir, and the mixing chamber facilitates adequate mixing of the ozone supplied to the liquid to be ozonated and facilitates substantially complete dissolving of any remaining ozone bubbles and ozone pockets within the liquid to thereby result in substantially uniform mixture of ozonated liquid for supply back to the reservoir having an increased contact rate of ozone to liquid of about 80% to 90%.

20 Claims, 9 Drawing Sheets

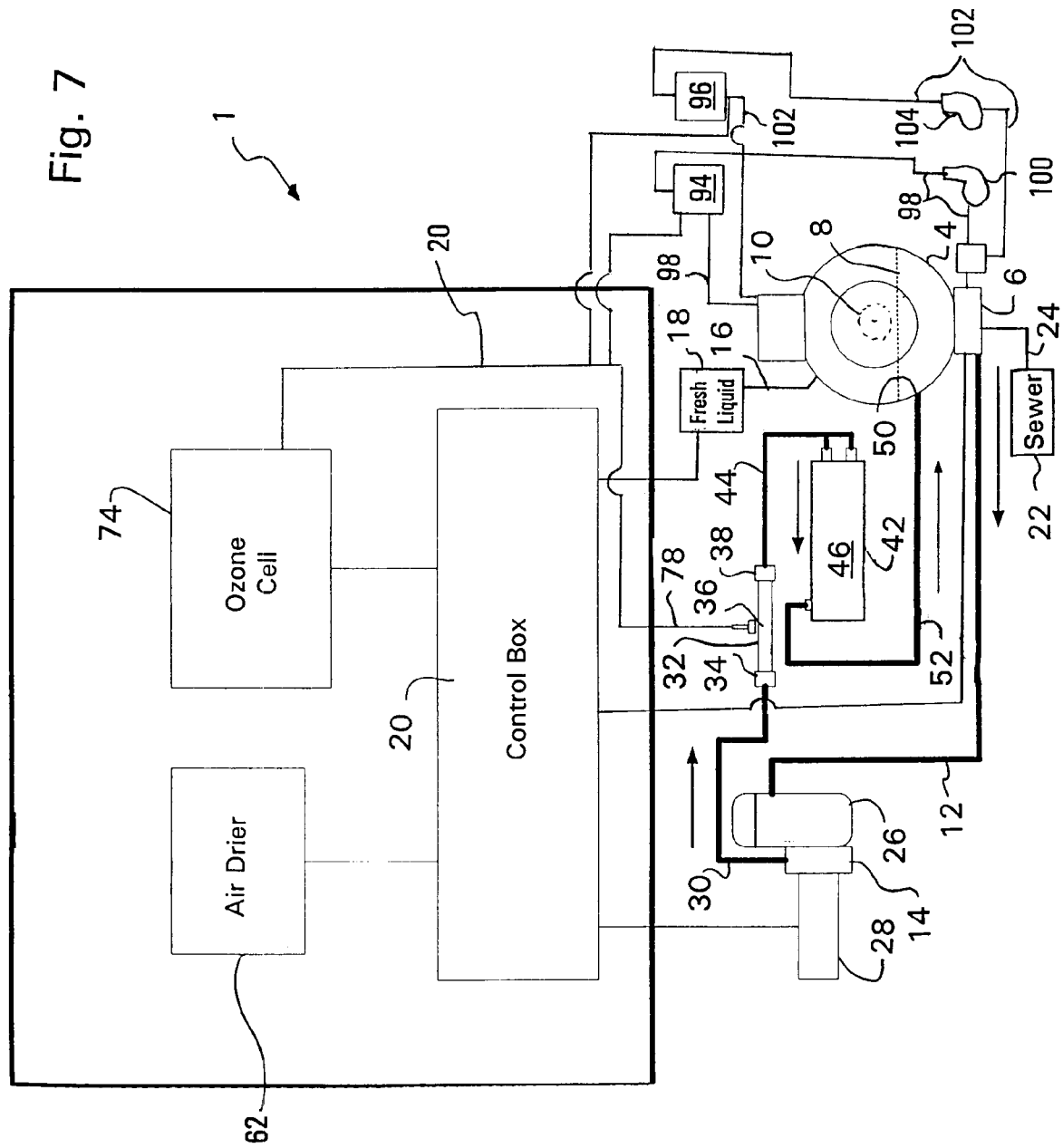

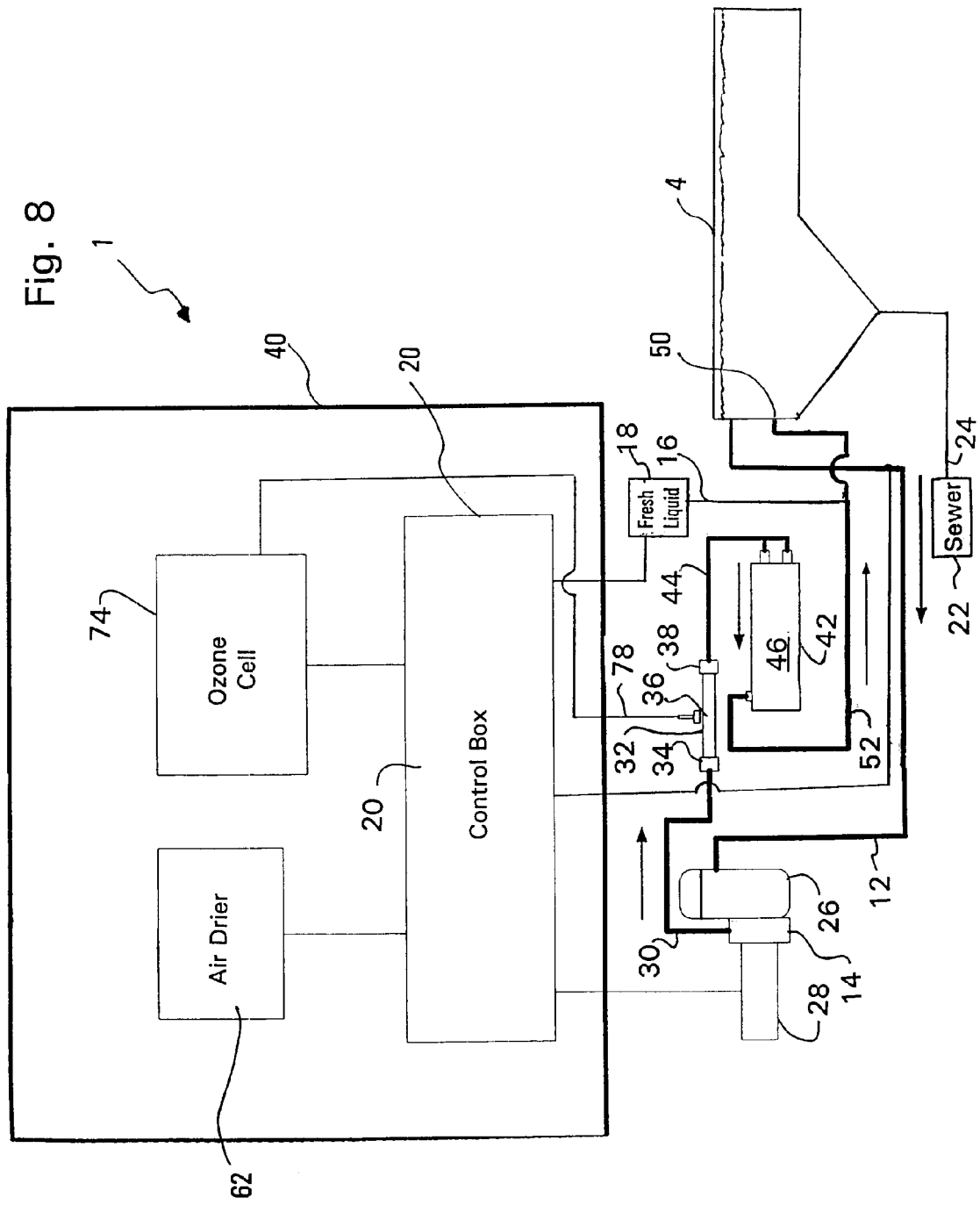

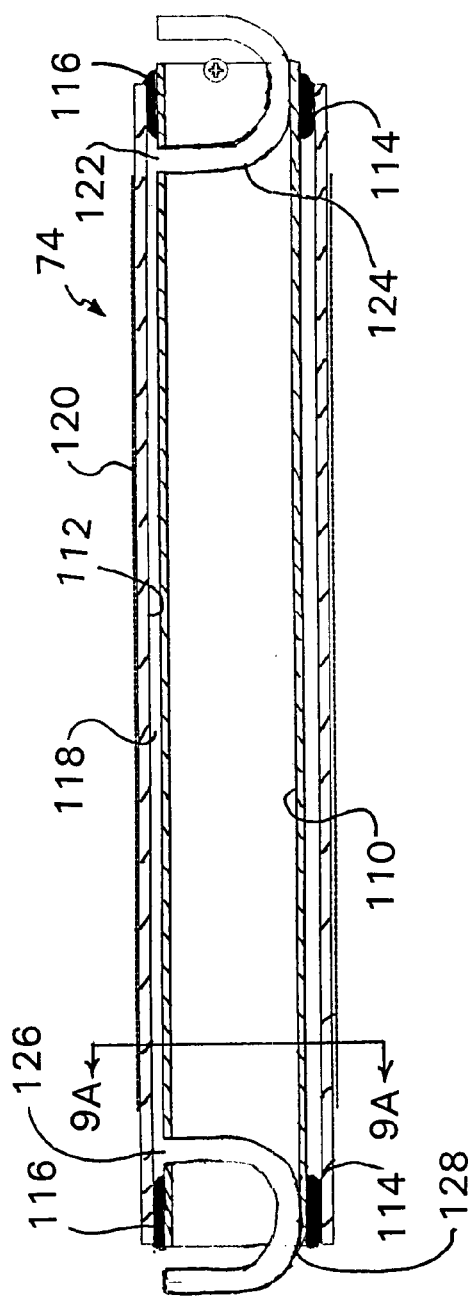
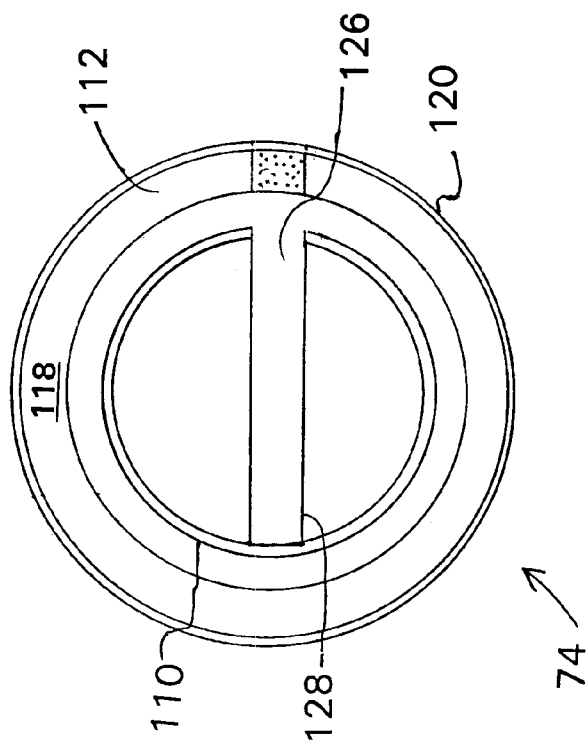

OZONE DISSOLVING SYSTEM FOR A RESERVOIR

FIELD OF THE INVENTION

The present invention relates to an improved system for increasing the contact ratio or rate of ozone to a liquid, such as water, to improve the cleaning and/or sterilization efficiency of the liquid during use.

BACKGROUND OF THE INVENTION

As is well known in the art, the application of ozone to a cleaning liquid, such as water, acts as a disinfectant as well as removing dirt, debris and other contaminants from a laundry detergent so that the laundry detergent can again be effective in removing dirt, debris and other contaminants from the clothing to be laundered. While it is known that dissolving ozone in a liquid, such as water, will assist with improving the cleaning and sterilization efficiency of the liquid, a number of the currently available prior art systems suffer a variety of associated drawbacks. In particular, a portion of the ozone which is added to the liquid does not become completely dissolved within or directly contact the liquid and thus is readily given off, dissipated and/or evaporated from the liquid as soon as the liquid enters into a reservoir or some other expansion chamber, for example. The undissolved ozone is not effective cleaning or disinfecting and thus not all of the ozone, which is added to the liquid, is active or effective in achieving the desired cleaning and/or sterilization intended by the ozonated liquid.

SUMMARY OF THE INVENTION

Wherefore, it is an object of the present invention to overcome the above mentioned shortcomings and drawbacks associated with the prior art.

Another object of the present invention is to provide a system which effectively dissolves substantially all of the added ozone within the liquid to increase the contact rate of the ozone to liquid (e.g. water) from a typical rate of about 60% to a rate of about 80% to about 90% thereby improving the cleaning and/or sterilization capability of the ozonated liquid.

A further object of the present invention is to increase the agitation of the liquid, following application of the ozone to the liquid, to facilitate a substantially complete break up and substantially complete dissolving of any small bubbles and/or pockets of ozone, remaining within the liquid, to achieve the desired cleaning and/or sterilization with the ozonated liquid prior to introducing the ozonated liquid into a reservoir or some other expansion chamber or container.

Yet another object of the present invention is to minimize the amount of movable components required in a mixing chamber of the system, to facilitate substantially complete dissolving of the added ozone, so as to minimize the servicing and/or maintenance requirements of the system while also increasing the longevity and durability of the system.

A still further object of the present invention is to increase the quantity of ozone dissolved within the liquid, such as water, by at least 25 percent and preferably as much as about 50 percent or more, so that the parts per million concentration of ozone dissolved within the liquid may be in excess of one part per million, in the mixing chamber, but will be no more than 1 part per million in the reservoir.

Another object of the present invention is to add a sufficient quantity of ozone to a liquid, such as water, so that the liquid can be used for cleaning soiled laundry without having to heat the water to an elevated temperature, e.g. a temperature of about 72 degrees Fahrenheit or greater, which is generally required to activate most laundry detergents and/or bleaches.

A further object of the present invention is to add a sufficient quantity of ozone to a liquid, such as water, so that the ozonated liquid can thereafter be used as a disinfectant to kill germs, bacteria, algae, and other customary microorganisms and diseases found within swimming pools, spas, hot tubs and the like.

Still another object of the present invention is to reduce consumption of laundry detergent by dissolving a greater amount of ozone within the liquid containing the laundry detergent, e.g. water, to remove a maximum amount of dirt, debris and other components from the laundry detergent and thereby enhance cleaning of the laundered clothing while minimizing use of the laundry detergent and/or the liquid.

Yet another object of the present invention is to collect and save a desired quantity of liquid (e.g. water) in one holding tank, or preferably two holding tanks, supported above the washing machine, and reuse all or a portion of the collected and save liquid, during either the same or the next cycle of the system, to minimize the liquid consumption of the system according to the present invention.

Still another object of the present invention is to provide a system which can be readily coupled to existing washing machines or other reservoirs to facilitate conversion of the same so that ozonated liquid may be utilized with such existing washing machines and/or reservoirs and thereby minimize the amount of pollutants and other contaminants which are discharged by the existing washing machines or reservoirs into a municipal sewer line.

The present invention also relates to a system for supplying ozone to a liquid stream, the system comprising an ozone generator for generating ozone; a reservoir containing a quantity of a liquid to be ozonated; a venturi for mixing the liquid to be ozonated with the generate ozone, the venturi having an inlet and an outlet with an orifice being located between the inlet and the outlet, and the ozone generator being coupled to the orifice for supplying the generated ozone thereto; a pump, coupled to an outlet of the reservoir and to the inlet of the venturi, for pumping liquid to be ozonated from the reservoir to the venturi; the outlet of the venturi being connected to a return inlet of the reservoir for supplying ozonated liquid back to the reservoir in a turbulent manner; and a mixing chamber coupling the outlet of the venturi to the return inlet of the reservoir, and the mixing chamber causing sufficient mixing of the ozone supplied to the liquid to be ozonated to facilitate substantially complete dissolving of any ozone bubbles and ozone pockets to thereby result in a contact rate of ozone to the liquid to be ozonated in excess of about 60% and form a substantially uniform mixture of ozonated liquid.

The present invention also relates to a system for supplying ozone to a liquid stream, the system comprising an ozone generator for generating ozone; a reservoir containing a quantity of a liquid to be ozonated; a venturi for mixing the liquid to be ozonated with the generate ozone, the venturi having an inlet and an outlet with an orifice being located between the Inlet and the outlet, and the ozone generator being coupled to the orifice for supplying the generated ozone thereto; a pump, coupled to an outlet of the reservoir and to the inlet of the venturi, for pumping liquid to be ozonated from the reservoir to the venturi, and the pump includes a filter for filtering the liquid to be ozonated prior to pumping the liquid to be ozonated to the venturi; the outlet of the venturi being connected to a return inlet of the reservoir for supplying ozonated liquid back to the reservoir in a turbulent manner; a mixing chamber coupling the outlet of the venturi to the return inlet of the reservoir, and the mixing chamber causing sufficient mixing of the ozone supplied to the liquid to be ozonated to facilitate substantially complete dissolving of any ozone bubbles and ozone pockets to thereby result in a contact rate of ozone to liquid in excess of about 60% and form a substantially uniform mixture of ozonated liquid; the system being used in combination with a washing machine, and the washing machine having a sump coupled to the inlet of the system and the outlet of the system supplies the ozonated liquid to the reservoir, and the ozone generator comprising at least one drier for removing moisture from the air, and the at least one drier is connected to an ozone cell for supplying the dried air thereto and facilitating generation of ozone from the dried air.

Finally, the present invention relates to a method of supplying ozone to a liquid stream, said method comprising the steps of generating ozone with an ozone generator; providing a reservoir containing a quantity of a liquid to be ozonated; mixing the liquid to be ozonated with the generate ozone in an venturi, the venturi having an inlet and an outlet with an orifice being located between the inlet and the outlet, and the ozone generator being coupled to the orifice for supplying the generated ozone thereto; coupling a pump to an outlet of the reservoir and to the inlet of the venturi for pumping liquid to be ozonated from the reservoir to the venturi; connecting the outlet of the venturi to a return inlet of the reservoir for supplying ozonated liquid back to the reservoir in a turbulent fashion; and coupling a mixing chamber to the outlet of the venturi to the return inlet of the reservoir, and the mixing chamber causing sufficient mixing of the ozone supplied to the liquid to be ozonated to facilitate substantially complete dissolving of any ozone bubbles and ozone pockets to thereby result in a contact rate of ozone to liquid in excess of about 60% and form a substantially uniform mixture of ozonated liquid.

BRIEF DESCRIPTION OF THE DRAWINGS

The invention will now be described, by way of example, with reference to the accompanying drawings in which:

FIG. 7 is a diagrammatic representation showing a preferred form of the present invention for use in a commercial washing machine application;

FIG. 8 is a diagrammatic representation showing use of the present invention in a swimming pool application;

FIG. 9 is a diagrammatic cross-sectional view of the improved ozone cell according to the present invention; and FIG. 9A is a diagrammatic cross-sectional view of the improved ozone cell of FIG. 9 along section line 9A—9A.

DESCRIPTION OF THE PREFERRED EMBODIMENTS(S)

Figure 1:
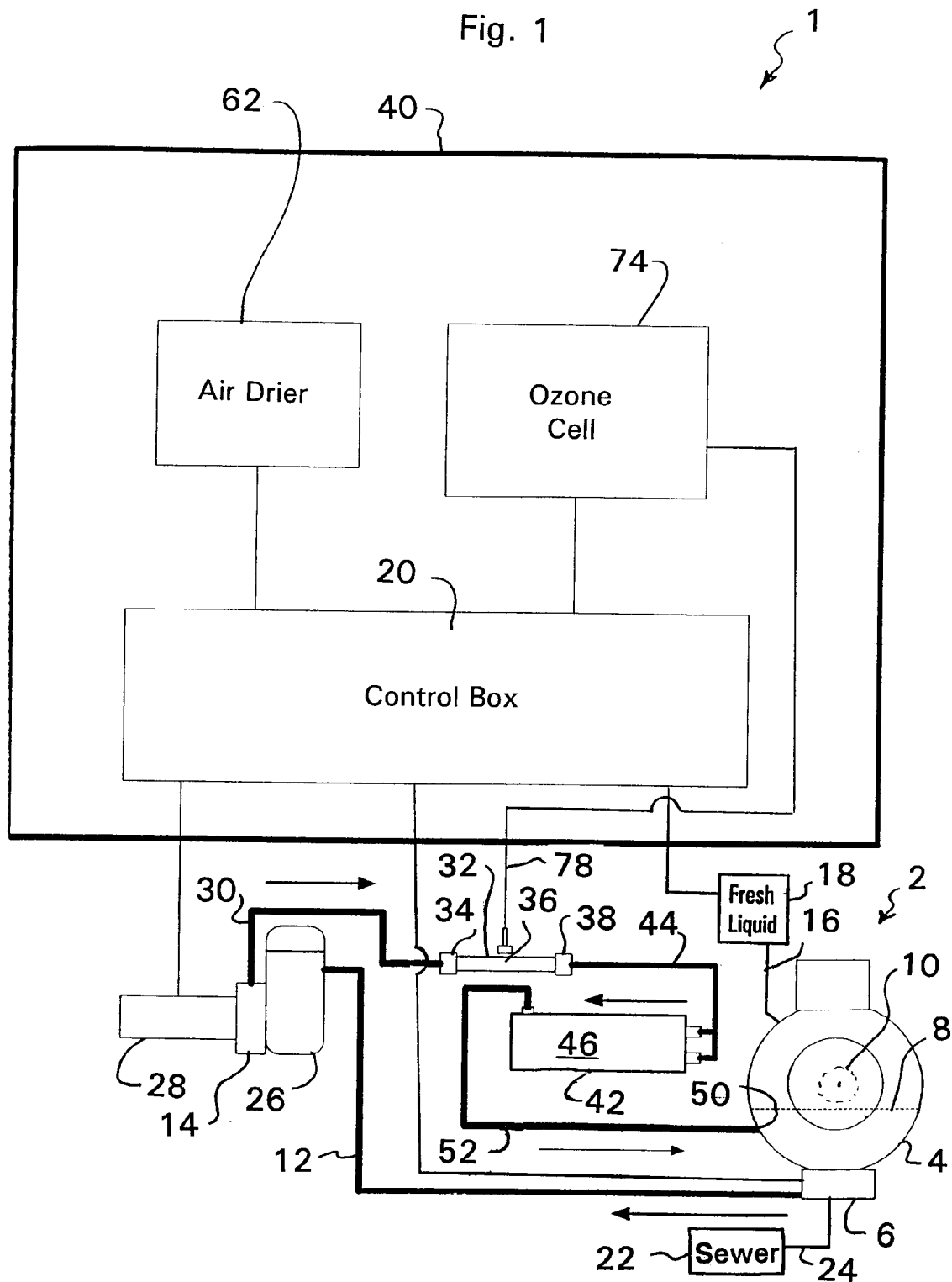
FIG. 1 is a diagrammatic representation showing the system of the present invention utilized with a washing machine application.

Turning first to FIG. 1, a detailed description concerning the basic components of system 1, according to the present invention, will now be provided. As can be seen in this Figure, the present invention generally comprises a washing machine 2 having a reservoir 4 coupled in a conventional manner to a sump 6. During operation, both the reservoir 4 and the sump 6 contain a desired quantity of a washing solution or liquid 8, such as water. Soiled clothing to be laundered (not shown) as well as a conventional agitator (not shown in detail) are located within the reservoir 4. The agitator is driven in a customary manner by a suitable motor 10 to cause rotation and/or up and down movement of the agitator in a conventional fashion to launder of the soiled clothing. A discharge outlet of the sump 6 is connected to a first end of a supply conduit 12 while an opposite end of the supply conduit 12 is connected to an inlet of a pump 14.

The reservoir 4 is connected, via a fresh water supply fine 16, to a fresh water source 18, e.g. a hot and/or a cold fresh water supply, for supplying clean water from the source 18 to the reservoir 4, when required. The flow of the fresh water from the fresh water source 18 is generally controlled by an automatic valve(s) connected to a computerized control box 20 of the system 1 or possibly by a manual valve(s). A drainage outlet is provided in a lower region of the sump 6 and the drainage outlet is connected to an appropriate sewer 22 via a drainage conduit 24 to facilitate discarding of all of the liquid contained within the reservoir 4 and the sump 6, when desired, once the cleaning cycle is completed and all of the soiled laundry has been adequately cleaned.

The washing machine 2 is typically provided with suitable water level sensors (not shown) which are electrically coupled to the computerized control box 20 of the system 1, in a standard fashion, to inform the system 1 when additional liquid is required by the reservoir 4, depending upon the washing cycle (e.g. a large, a medium, a small, an extra small, etc.), or that a sufficient amount of liquid has been conveyed to the reservoir 4 and to discontinue the supply of additional liquid to the reservoir 4. The reservoir may also be provided with an overflow which is connected to the sewer 22 to allow any excess liquid to be discarded to the sewer. As such water supply and drainage features are conventional and well known in the art, a further detailed description concerning the same is not provided.

The inlet to the pump 14 is provided with a customary strainer basket or filtering member 26 which filters the liquid (e.g. water), pumped from the sump 6, to remove dirt, debris, lint, and/or other solid particles, prior to the liquid (e.g. water) being pumped by the pump 14. The pump 14 is driven by a motor 28, in a traditional manner, and the motor 28 is electrically coupled to the computerized control box 20 of the system 1 in a standard fashion to facilitate control of the pump 14. A discharged outlet of the pump 14 communicates, via a conveying conduit 30, with an inlet 34 of a venturi 32, such as a MAZZEI injector. A venturi orifice 36 is located in a central region of the venturi 32 between the venturi inlet 34 and a venturi outlet 38. A generated ozone 40 is connected to the venturi orifice 36 to supply ozone thereto and a further discussion concerning the importance of same will follow below. Due to this arrangement, the venturi 32 facilitates initial mixing of the supply of ozone and the pumped liquid (e.g. water).

It is to be appreciated that the supplied ozone is drawn or sucked into the venturi orifice 36 due to a vacuum created on the exit side of the venturi 32. That is, the pump liquid (e.g. water) is initially compressed and accelerates as the pumped liquid (e.g. water) passes through or by the venturi orifice 36 and thereafter decelerates as the liquid (e.g. water) expands within the venturi outlet 38 of the venturi 32. This phenomena inherently creates a vacuum at the venturi orifice 36 and this vacuum is utilized to suck generated ozone in though the venturi orifice 36 from an ozone supply conduit 78. This sucked ozone is combined with the liquid (e.g. water) within the venturi 32 and this combination induces a preliminary mixing and contact of the ozone with the liquid (e.g. water) to facilitate dissolving a majority, but not all, of the supplied ozone within the liquid (e.g. water). That is, the contact rate of the ozone to liquid (e.g. water) is generally about 60% following preliminary mixing.

While many of the prior art systems have appreciated that a certain time lag or retention time is required or desired, following initial mixing of the ozone with the liquid (e.g. water) prior to discharging the ozonated liquid (e.g. water) into the reservoir 4, none of the currently known systems has been effective in increasing the contact rate of the ozone to liquid (e.g. water) from a normal rate of about 60% to a rate of about 80% to about 90% and thereby result in substantially complete dissolving and/or uniform distribution of all of the supplied ozone with the liquid (e.g. water).

The present invention is directed at a system 1 which improves the contact rate of the ozone to liquid (e.g. water) from a normal rate of about 60% to a rate of about 80% to about 90% by providing a mixing chamber 42 immediately following the venture 32. A first section of a return conduit 44 connects the outlet of the venturi 32 to a pair of inlets of the mixing chamber 42. The pair of inlets of the mixing chamber 42 receives the initially and partially mixed ozone and liquid (e.g. water) solution, discharged from the venturi 32, and thereafter assist with substantially complete mixing and/or dissolving of any remaining ozone bubbles and/or ozone pockets, which did not initially and completely dissolve within the liquid (e.g. water) as a result of passing through the venturi 32 to improve the ozone contact rate. A second section of a return conduit 52 connects an outlet of the mixing chamber 42 to an inlet 50 of the reservoir 4 to convey the completely mixed ozonated liquid (e.g water) to the reservoir 4 for use. Preferably, at least the second section, and preferably also the first section, of the return conduit 52 is a flexible internal ribbed tubing, or some other conduit, with irregularities or discontinuities on an inwardly facing surface thereof which are designed to induce turbulence of the mixed ozonated liquid (e.g. water). That is, the irregularities or discontinuities on an inwardly facing surface minimize laminar flow of the ozonated liquid as the ozonated liquid (e.g. water) is conveyed from venturi 32 and the mixing chamber 42 to the reservoir 4.

The mixing chamber 42 is designed to facilitate substantially complete dissolving of all of the supplied ozone within the liquid (e.g. water), i.e. to increase the contact rate of the ozone to liquid (e.g. water) to about 80% to about 90% or so and result in a substantially uniform mixture of ozone and liquid (e.g. water). That is, according to the prior art systems hereto forth known, only an ozone to liquid (e.g. water) contact rate of about 60% was achievable while the present invention facilitates achieving an increased ozone to liquid (e.g. water) contact rate by at least 25 percent and more preferably about 50 percent to a contact rate of about 80% to about 90%.

Figure 2:
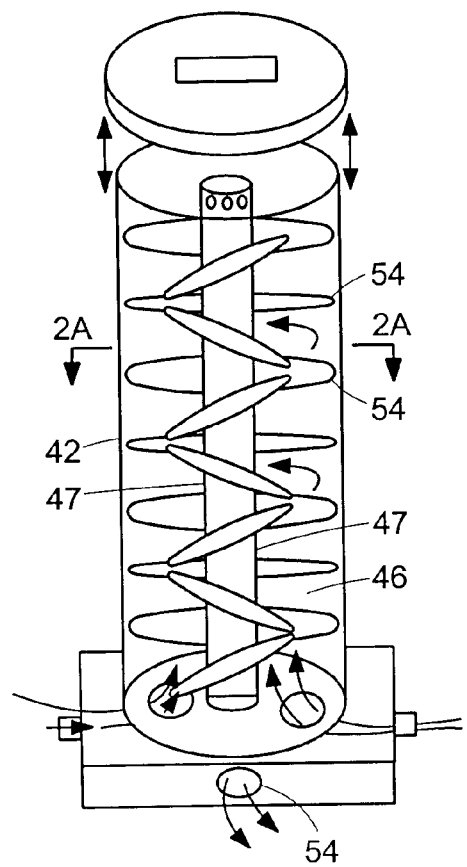
FIG. 2 is a diagrammatic view of a first embodiment of a mixing chamber, according to the present invention, for adequately mixing the added ozone with the liquid to be ozonated.
Figure 2A:
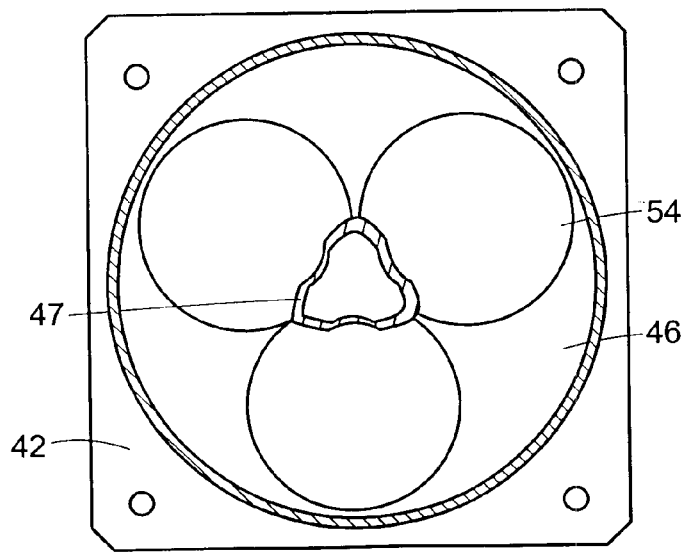
FIG. 2A is a diagrammatic cross-sectional view along section line 2A—2A of FIG. 2, of the mixing chamber.

With reference now to FIGS. 2 and 2A, a further description concerning various aspects of the first embodiment of the mixing chamber 42 will now be provided. As can be seen in these Figures, the mixing chamber 42 is generally cylindrical in shape and has at least one inlet, and preferably two inlets located in a first end wall thereof and preferably a single outlet centrally located in the same end wall of the mixing chamber 42, as can be seen in FIG. 2. The interior space 46 within the mixing chamber 42 supports a multitude or a plurality of airfoils or baffles 54. The plurality of airfoils or baffles 54 are each supported by and extend radially from a centrally located discharge pipe 47 and are arranged within the interior space 46 to form a serpentine pattern which causes the ozone/liquid mixture to zigzag or meander as it flows from one end to the other end of the mixing chamber 42. Once the ozone/liquid mixture reaches the opposite end of the mixing chamber 42, the ozone/liquid mixture enters one of a plurality of inlet apertures formed in the discharge pipe 47 and flows along its length toward the outlet.

Each of the airfoils or baffles 54 has a length of about 4 inches, a width of about 4 inches and a thickness of about 1 inch. The plurality of airfoils or baffles 54 thus form restrictions and/or obstructions within the mixing chamber 42 around which the liquid (i.e. water) and undissolved ozone must pass. Such restrictions or obstructions within the mixing chamber 42 preferably reduce the transverse cross sectional area of the mixing chamber 42 by at least 10 percent, more preferably reduce the transverse cross sectional area of the mixing chamber 42 by at least 20 percent, and most preferably reduce the transverse cross sectional area of the mixing chamber 42 by at least 30 percent or more.

Due to the position and orientation of the plurality of airfoils or baffles with respect to the two inlets, as the liquid (e.g. water) and any undissolved ozone bubbles and/or ozone pockets flow toward any of the airfoils or baffles 54, the liquid (e.g. water) and any undissolved ozone bubbles and/or ozone pockets contact the leading edge of one of the plurality of airfoils or baffles 54 and is then redirected to flow along either surface of the airfoil or baffe 54. Upon contacting the leading edge of one of the plurality of airfoils or baffles 54, the liquid (e.g. water)/ozone mixture slightly accelerates and such acceleration increases the turbulence and/or mixing between the liquid (e.g. water) and the ozone. This turbulence also causes the ozone bubbles and/or pockets to break apart and this further assists with dissolving any remaining ozone within the liquid (e.g. water). Consequently, at the outlet of the mixing chamber 42, the contact rate of the ozone to liquid (e.g. water) is about 80% to about 90% and the supplied ozone is substantially completely dissolved within the liquid (e.g. water). Thereafter, the thoroughly mixed liquid/ozone mixture is conveyed to the inlet 50 of the reservoir 4 in a turbulent fashion, via the second section of the return conduit 52, to supply the ozonated liquid (e.g. water) to the reservoir 4, e.g. to the washing machine In this example.

As noted above, the liquid (e.g. water) and the ozone are further mixed within the mixing chamber 42 and the ozone facilitates removing dirt, debris and other contaminants from the laundry detergent to assist with "cleansing" of the laundry detergent and facilitate recycling and reuse of the laundry detergent once the cleansed laundry detergent is returned back to the reservoir 4. According to the system 1 of the present invention, most of the added ozone is "gassed off", once the ozonated liquid is conveyed to the reservoir 4 and eventually reaching the sump 6. The gassing off of the ozone results in a lower concentration level of ozonated liquid within the sump 6 of the reservoir 4. This lower concentration level of ozone also reduces the potential harm to the clothing being laundered-ozone is significantly more powerful than bleach.

Figure 3:
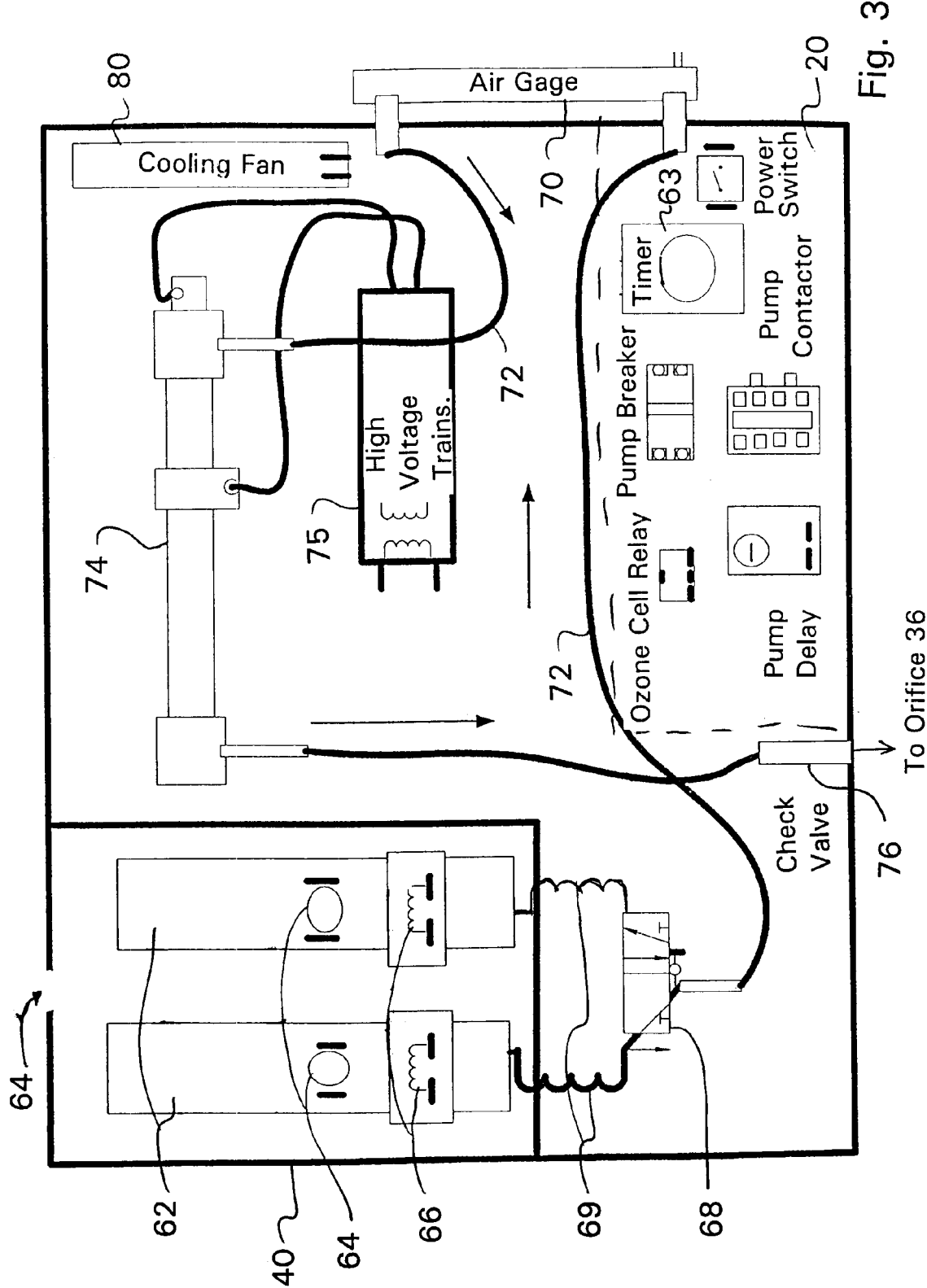
FIG. 3 is a diagrammatic view of an ozone generator for use with the system of the present invention.

With reference not to FIG. 3, a detailed description concerning the ozone generator 40, according to the present invention, for generating an ample supply of ozone for mixing with the liquid (e.g. water) will now be provided. The ozone generator 40 is a self-contained unit which generates a desired quantity of ozone for the system 1. The ozone generator 40 also houses all of the necessary control devices to facilitate operation of the system 1 as well as control of the associated reservoir, e.g a washing machine.

As can be seen in this Figure, the ozone generator 40 comprises a fairly conventional design and includes at least one air drier, and preferably a pair of conventional desiccant tube driers 62 which are provided for drawing air in from the surrounding environment, via an air inlet 64, and suitably drying the supplied air prior to conveying the same to an ozone cell 74 for generating ozone. Each desiccant tube drier 62 includes a heater 66 as well as a thermostat 64 to control the temperature of the heater 66 of the desiccant tube drier 62. The pair of air desiccant tube driers 62 assists with removing undesired and/or unwanted moisture, from the drawn in air, and also slightly increase the oxygen content of the dried air prior to conveying the same to the ozone cell 74 for conversion to ozone.

The drawn in air, from the surrounding environment, enters a first end of one of the desiccant tube driers 62 and, as this air flows therealong, the air is suitably dried in a conventional fashion. An air control valve 68 is connected to the second ends of both of the pair of desiccant tube driers 62, possibly via a pair of air cooling coils 69, to convey the dried air, with the increased oxygen content, from one of the desiccant tube driers 62 to an air gage 70 via an air supply conduit 72.

During normal operation of the system 1, only one of the pair of desiccant tube driers 62 is operating while the other one of the pair of desiccant tube driers 62 is inactive and is generally cooling. A timer 63, which is incorporated within the control box 20, is electrically coupled to the pair of desiccant tube driers 62 and controls the time period during which each one of the desiccant tube driers 62 is operational and the timer 63 periodically switches back and forth between the pair of desiccant tube driers 62. Typically, the control box 20 is programmed, depending upon the particular drying needs, so that while one of the desiccant tube driers 62 is operating and drying air, the other desiccant tube drier 62 is being cycled to heat up and evaporate the moisture removed from the air and thereafter be allowed to cool to a temperature below 160 degrees Fahrenheit prior to again resuming service to dry air. This repeated switching between the pair of desiccant tube driers 62 extends the service life of the desiccant tube driers 62.

The control box 20 is electrically coupled to the air valve 68 to shut off the flow of air through a desired one of the desiccant tube driers 62, by suitable switching of the air valve 68, and to simultaneously activate and supply energy to the associated heater 66 to heat the shut down desiccant tube drier 62 and drive off the water and other moisture removed from the air during the drying process. The switching of the air valve 68 causes the other desiccant tube drier 62 to commence drying and supplying air to the ozone cell 74. It is to be appreciated that while air is flowing through the active desiccant tube drier 62, the other tube drier 62 is heated to a predetermined temperature, e.g. a temperature of about 450 degrees Fahrenheit, which is regulated by the associated thermostat 64 to drive off the removed water or moisture. The associated heater 66 will be operational for a predetermined period of time, e.g. about 240 minutes. Once this period of time has elapsed, the control box 20 will turn the associated heater 66 off and the associated desiccant tube drier 62 will then be allowed to cool before returning back to service. The above discussed switching procedure repeatedly occurs during operation of the system 1 so that a clean and dry supply of air is continuously supplied to the ozone cell 74.

An outlet of the air gage 70 is, in turn, connect by a further section of the air supply conduit 72 to an air inlet of an ozone cell 74. The air gage is provided with a mechanism which facilitates adjustment of the flow rate of the dried air to the ozone cell 74. This air flow rate is typically adjusted depending upon the size of the wash and/or the laundry conditions. As the supplied dried air enters the ozone cell 74 and flows therealong, this dried air is subjected to a high voltage, from voltage source 75. This applied voltage, in turns, then generates ozone within the ozone cell 74 from the dried air in a customary fashion. The air gage and the voltage source 75 are both coupled to the computerized control box 20 of the system 1 in a standard fashion to control operation thereof. As such ozone generation feature is conventional and well known in the art, a further detail discussion concerning the same is not provided.

The generated ozone then exits the ozone cell 74 and passes through a one way check valve 76 which allows flow only in one direction—before being supplied from the ozone generator 40 to the venturi orifice 36. The ozone supply conduit 78 connects an outlet of the check valve 76 with the venturi orifice 36 of the venturi 32 to convey the generated ozone thereto. As noted above, the flow of the generated ozone along the ozone supply conduit 78 occurs primarily due to the vacuum created as the liquid (e.g. water) passes by the venturi orifice 36.

The ozone generator 40 is also provided with at least one cooling fan 80 that supplies cooling air for cooling the ozone cell 74. After the cooling air passes along and through a center of the ozone cell 74, this cooling air then passes by the internal electrical components of the ozone generator 40 and this cooling air is finally flows toward and exits the ozone generator 40 adjacent the air inlet 64. The cooling fan 80 is electrically coupled to the computerized control box 20 of the system 1 in a standard fashion to control operation thereof.

Figure 4:
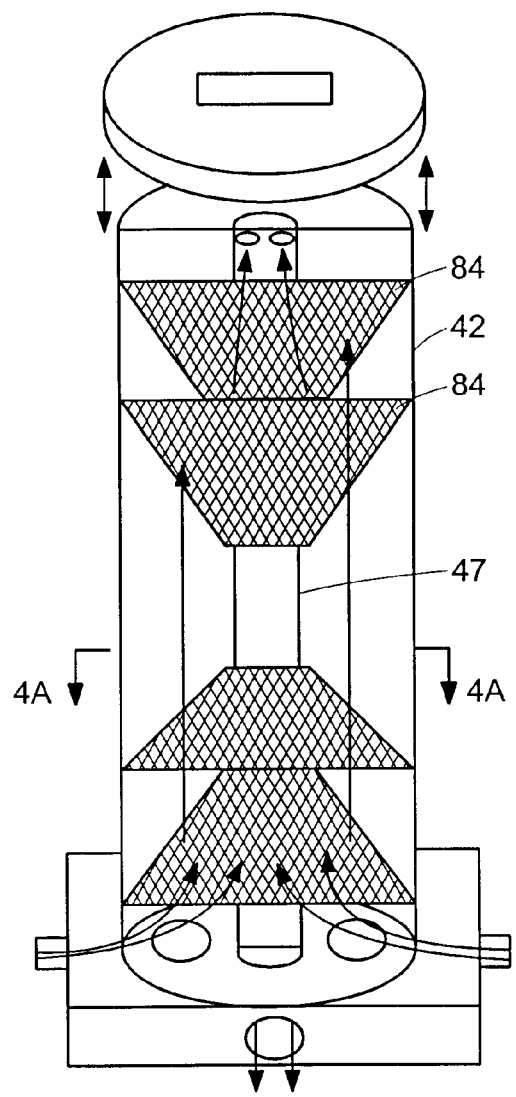
FIG. 4 is a diagrammatic view of a second embodiment of the mixing chamber, according to the present invention, for adequately mixing the added ozone with the liquid to be ozonated.
Figure 4A:
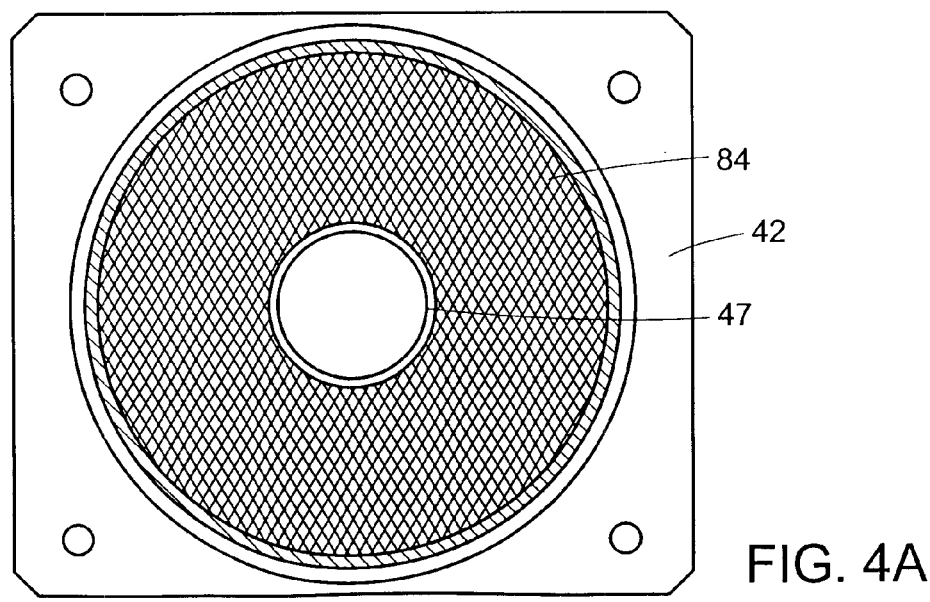
FIG. 4A is a diagrammatic cross-sectional view along section line 4A—4A of FIG. 4, of the mixing chamber.

With reference now to FIGS. 4 and 4A, a detailed description concerning various aspects of a second embodiment of the mixing chamber 42 will now be provided. As this embodiment is somewhat similar to the first embodiment is some respects, only the differences between the second embodiment and the first embodiment will be discussed in detail. As can be seen in FIG. 4, the mixing chamber 42 has at least one inlet, and preferably two inlets located in a first end wall and a single outlet located in the same end wall, as can be seen in FIG. 4. At least one screen or some other fine mesh material 84, and preferably two to four or more sequentially arranged screens or fine mesh materials 84, traverse the interior space 46 of the mixing chamber 42. The sequentially arranged screens or fine mesh materials 84 are preferably conical in shape. An inner perimeter of the screens or fine mesh materials 84 is sealed with respect to and extends from an exterior surface of the discharge pipe 47 while an outer perimeter of the screens or fine mesh materials 84 is sealed with respect to and secured to an inwardly facing surface of the mixing chamber 42. The screens or fine mesh materials 84 thus form a plurality of restrictions or obstructions within the mixing chamber 42 through which the liquid/ozone mixture must pass. These restrictions and/or obstructions within the mixing chamber 42 preferably reduce the transverse cross sectional area of the mixing chamber 42 by at least 30 percent and more preferably reduce the transverse cross sectional area of the mixing chamber 42 by at least 50 percent. The mesh size of the sequentially arranged screens or fine mesh materials 84 is about ¼ of an inch to about ⅛ of an inch or so.

Due to the position and orientation of the screens or fine mesh materials 84, as the liquid (e.g. water) and any undissolved ozone bubbles and/or ozone pockets passes through the screens or fine mesh materials 84, the liquid (e.g. water) and any undissolved ozone bubbles and/or ozone pockets contact an exterior surface of the screens or fine mesh materials 84. Upon contacting with the exterior surface of the screens or fine mesh materials 84, the liquid/ozone mixture typically accelerates slightly and such acceleration increases the turbulence and/or mixing between the liquid (e.g. water) and the ozone. This turbulence also causes the ozone bubbles and/or pockets to break apart and assists with further dissolving of any undissolved ozone within the liquid (e.g. water). Consequently, at the outlet of the mixing chamber 42, the supplied ozone is substantially completely dissolved within the liquid (e.g. water). Thereafter, the thoroughly mixed liquid/ozone mixture is conveyed to the inlet 50 of the reservoir 4, via the second section of the return conduit 52, to convey the ozonated liquid (e.g. water) to the reservoir 4 for use.

Figure 5:
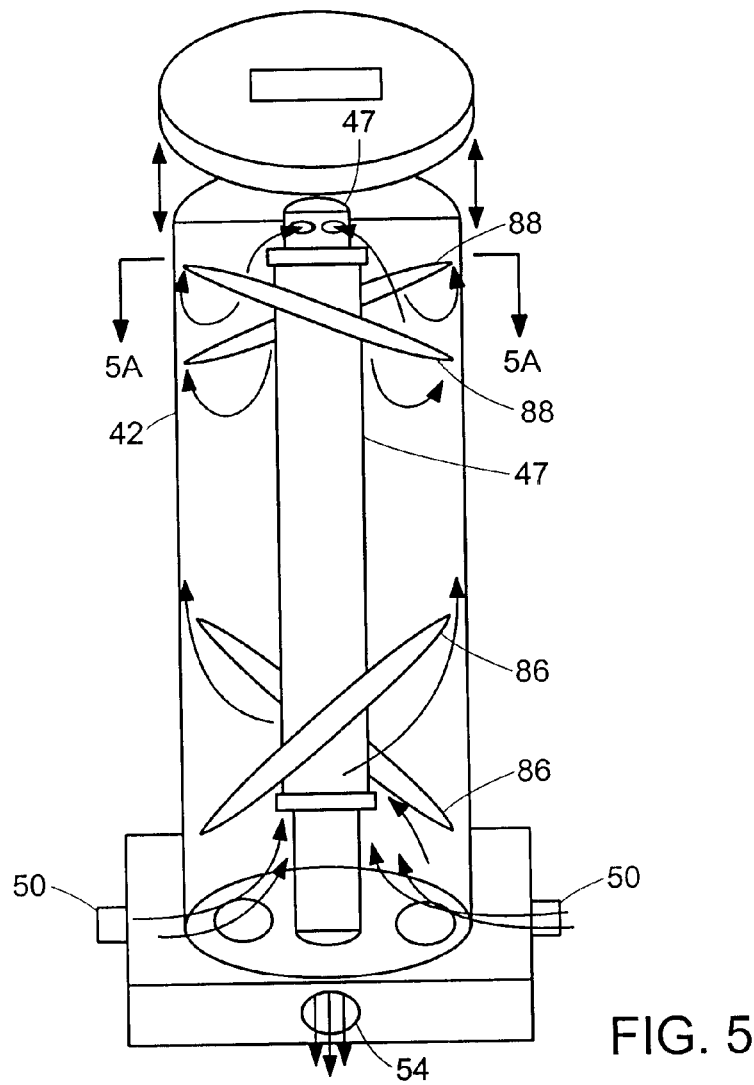
FIG. 5 is a diagrammatic view of a third embodiment of a mixing chamber, according to the present invention, for adequately mixing the added ozone with the liquid to be ozonated.
Figure 5A:
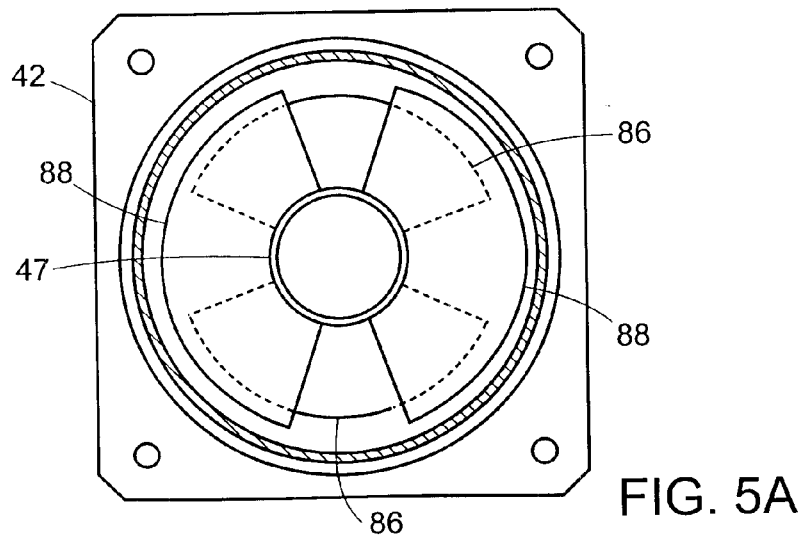
FIG. 5A is a diagrammatic cross-sectional view along section line 5A—5A of FIG. 5, of the mixing chamber.

With reference now to FIGS. 5 and 5A, a detailed description concerning various aspects of a third embodiment of the mixing chamber 42 will now be provided. As this embodiment is somewhat similar to the first embodiment, only the differences between the third embodiment and the first embodiment will be discussed in detail. As can be seen in FIG. 5, the mixing chamber 42 has at least one inlet, and preferably two inlets, located in a first end wall of and preferably a single outlet located in the same end wall, as can be seen in FIG. 5. Two pair of oppositely rotatable propeller blades 86, 88 (somewhat similar to a conventional turbo charger arrangement), are sequentially arranged, one after another along an axial length of the mixing chamber 42. An intermediate, non-rotatable section 90 of the pair of oppositely rotatable propeller blades 86, 88 houses associated gearing (not shown in detail) to facilitate rotation of the propeller blades 86, 88 in opposed directions in a conventional manner. The two pairs of oppositely rotatable propeller blades form restrictions and/or obstructions within the mixing chamber 42 around which the liquid (i.e. water) and ozone must pass. These restrictions and/or obstructions within the mixing chamber 42 preferably reduces the transverse cross sectional area of the mixing chamber 42 and form a serpentine pattern which causes the ozone/liquid mixture to zigzag and/or meander as it flows from one end to the other end of the mixing chamber 42. Once the ozone/liquid mixture reaches the opposite end of the mixing chamber 42, the ozone/liquid mixture enters the inlet apertures formed in the discharge pipe 47 and flows along its length toward the outlet.

Due to the position, orientation. and/or rotation of the two pairs of oppositely rotatable propeller blades 86, 88, as the liquid (e.g. water) and any undissolved ozone bubbles and/or ozone pockets passes by the first pair of oppositely rotatable propeller blades 86, 88, a first pair of blades 86 rotate in a first direction while a second pair of rotatable propeller blades 88 rotate in the opposite direction. Some of the liquid (e.g. water) and any undissolved ozone bubbles and/or ozone pockets initially contacts the leading edges of the first pair of rotatable propeller blades 86. Upon contacting the leading edges of the first pair of rotatable propeller blades 86, the liquid/ozone mixture causes the first rotatable propeller blades 86 to rotate in a first direction and such rotation induces an opposite rotation, via the conventional associated gearing, of the second pair of rotatable propeller blades 88. This opposite rotation of the two pair of oppositely rotatable propeller blades 86, 88 causes further turbulence which results in any remaining ozone bubbles and/or pockets breaking apart and completely dissolving within the liquid, e.g. water. Consequently, at the outlet of the mixing chamber 42, the contact rate of the ozone to liquid (e.g. water) is about 80% to about 90%. Thereafter, the throughly mixed liquid/ozone mixture is conveyed to the inlet 50 of the reservoir 4, via the second section of the return conduit 52, for use.

Figure 6A:
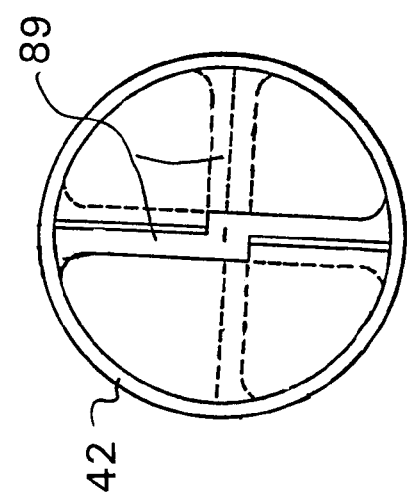
FIG. 6A is a diagrammatic cross-sectional view along section line 6A—6A of FIG. 6, of the mixing chamber.
Figure 6:
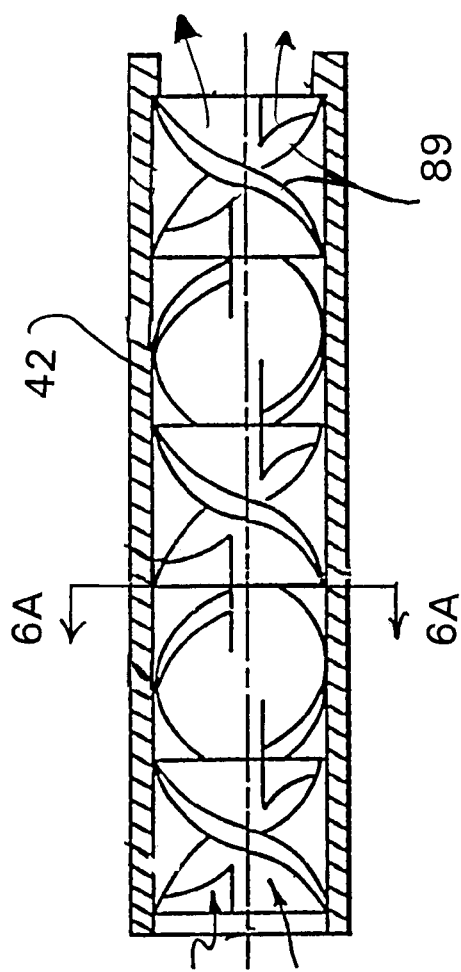
FIG. 6 is a diagrammatic view of a fourth embodiment of a mixing chamber, according to the present invention, for adequately mixing the added ozone with the liquid to be ozonated.

With reference now to FIGS. 6 and 6A, a detailed description concerning various aspects of a fourth embodiment of the mixing chamber 42 will now be provided. As this embodiment is somewhat similar to the first embodiment, only the differences between the fourth embodiment and the first embodiment will be discussed in detail. As can be seen in FIG. 6, the mixing chamber 42 has at least one inlet located in an end wall of thereof and preferably a single outlet located adjacent an opposite end thereof, e.g. in either the end wall or a side wall of the mixing chamber 42 as can be seen in FIG. 6. A conventional static or motionless mixer 89, for example a static mixer as disclosed in U.S. Pat. No. 5,174,653, which teaching is incorporated by reference, is located within the mixing chamber 42. The static mixer 89 forms a restrictions and/or obstructions within the mixing chamber 42 around or by which the liquid/ozone mixture must pass. These restrictions and/or obstructions within the mixing chamber 42 preferably reduce the transverse cross-sectional area of the mixing chamber 42 and facilitate increasing the contact rate of the ozone to liquid (e.g. water) to a rate of about 80% to about 90%.

Due to the position, orientation and rotation of the static mixer, as the liquid (e.g. water) and any undissolved ozone bubbles and/or ozone pockets passes through the mixing chamber 42, the liquid (e.g. water) and any undissolved ozone bubbles and/or ozone pockets contact the leading edges of the static mixer and is then redirected to flow along either opposed surface of the static mixer. Upon contacting the leading edges of the static mixer, the liquid/ozone mixture slightly accelerates and such acceleration increases the turbulence and/or mixing between the liquid (e.g. water) and the ozone. This turbulence also causes the ozone bubbles and/or pockets to break apart and this further assists with dissolving any remaining ozone within the liquid (e.g. water). Consequently, at the outlet of the mixing chamber 42, the contact rate of the ozone to liquid (e.g. water) is about 80% to about 90% and the supplied ozone is substantially completely dissolved within the liquid (e.g. water). Thereafter, the throughly mixed liquid/ozone mixture is conveyed to the inlet 50 of the reservoir 4 in a turbulent fashion, via the second section of the return conduit 52.

Turning now to FIG. 7, a brief description concerning a second embodiment of the present invention will now be briefly discussed. As this embodiment is very similar to the first embodiment in may respects, only the differences between this embodiment and the previous embodiment will be discussed in detail. The major difference between this embodiment and the first embodiment Is that first and second holding tanks 94, 96 (e.g. a high level fill holding tank and a low level fill holding tank) are provided above the washing machine 2 for holding a supply of liquid, e.g. rinse water. The sump 6 of the washing machine 2 has a common washer filter 95 and a first section of a first supply conduit 98 supplies liquid to an inlet of a first washing machine pump 100. An outlet of the first washing machine pump 100 is connected, by a second section of the first supply conduit 98, to an inlet of the first holding tank 94. An outlet of the first holding tank 94 is connected to by a third section of the first supply conduit 98 to supply liquid from the first holding tank 94 to the reservoir 4, when desired, via gravity. The outlet of the first holding tank 94 includes an automatic valve (not shown) which is coupled to the computerized control box 20 of the system 1 in a standard fashion to control operation thereof.

A first section of a second supply conduit 102 is connected to the common washer filter 95 for supplying liquid to an inlet of a second washing machine pump 104. An outlet of the second washing machine pump 104 is connected, by a second section of the second supply conduit 102, to an inlet of the second holding tank 96. An outlet of the second holding tank 96 is connect to by a third section of the second supply conduit 102 to supply liquid from the second holding tank 96 to the reservoir 4, when desired, via gravity. The outlet of the second holding tank 96 includes an automatic valve (not shown) which is coupled to the computerized control box 20 of the system 1 in a standard fashion to control operation thereof.

Both the first and second holding tanks 94, 96 have an overflow mechanism (not shown) which is connected to the sewer 22, in a standard manner, so that any excess liquid pumped to either the first and/or the second holding tanks 94 or 96 is discharged directly into the sewer 22. This embodiment allows the system 1 to reuse a portion of the liquid (e.g. water) during the same or the next cycle of the system 1.

Turning now to FIG. 8, a brief description concerning a third embodiment of the present invention will now be briefly discussed. As this embodiment is very similar to the first embodiment in may respects, only the differences between this embodiment and the previous embodiment will be discussed in detail. The major difference between this embodiment and the first embodiment is the intended application, i.e. this application is for use with a swimming pool rather than a washing machine.

As can be seen in this Figure, the reservoir 4 generally comprises a swimming pool containing a desired quantity of a water in which to swim—a sump is not required in this application. As with the first embodiment, the outlet of the pool reservoir 4 is connected to a first end of a supply conduit 12 while the outlet of the mixing chamber 42 is connected with the inlet 50 of the pool reservoir 4 via the second section of the return conduit 52 to convey the ozonated liquid (e.g. water) back into the pool reservoir 4 for use. A heater (not shown) may also be provided for heating the water prior to returning the same back to the reservoir or pool 4. In all other respects, this embodiment is identical to the first embodiment of the system 1.

Turning now to FIGS. 9 and 9A, a detailed description concerning the improved ozone cell 74, according to the present invention, will now be described. The ozone cell 74 generally comprises an elongate inner tube 110 manufactured from steel or stainless steel, for example. The inner tube 110 is generally one inch in diameter and is encased or surrounded by an elongate outer tube 112 manufactured from glass, for example. An interior surface of the elongate outer tube 112 is spaced from an exterior surface of the inner tube 110 by a distance of about an ⅛ inch or so. A pair of spaced apart O-rings 114, one located adjacent each end between the elongate outer tube 112 and the inner tube 110, are provided to maintain the spacing between the elongate outer tube 112 and the inner tube 110. Each O-ring 114 is glued, e.g. by silicone, or otherwise secured in place by an appropriate adhesive 116 to seal the opposed ends of the ozone cell 74. The interior surface of the elongate outer tube 112, the exterior surface of the inner tube 110 and sealed pair of spaced apart O-rings 114 define an ozone cell cavity 118.

The exterior surface of the outer tube 112 is covered with a thin layer of foil or some other conductive material 120 and this conductive material 120 is coupled to the high voltage source 75 to supply an electrical voltage to the ozone cell 74, e.g. a voltage of about 10,000 volts or so. This voltage is supplied to the conductive material 120 and passes through the outer tube 112 and forms a plurality of arcs. The formed arcs jump toward the exterior surface of the inner tube 110 and such arcing generates ozone from the dried air located within the ozone cell cavity 118 in a conventional manner.

To facilitate supplying dried air to the ozone cell cavity 118 of the ozone cell 74, an inlet aperture 122 is provided in a side wall of the inner tube 110 adjacent a first end thereof and an air supply conduit 124 is welded to and communicates with the supplying inlet aperture 122. An outlet aperture 126 is provided in a side wall of the inner tube 110, adjacent a second opposed end thereof, to facilitate removing the generated ozone and an ozone supply conduit 128 communicates with and is welded to the supplying outlet aperture 126. The ozone supply conduit 128 conveys the generated ozone from the ozone cell cavity 118 to the check valve 76.

An important aspect of the ozone cell, according to the present invention, is that it eliminates and simplifies the construction of the ozone cell. In particular, the associated costs of manufacturing the ozone cell are significantly reduced while still resulting in an ozone cell that produces an adequate supply of ozone.

According to the present invention, the pump generally has a capacity of between 10 to 100 gallons per minute of liquid (e.g. water), and more preferably a capacity of between 40 to 60 gallons per minute. The ozone generator will preferable generate between approximately 1 to 10 grams of ozone per hour, and more preferably will generate between approximately 3 to 4 grams of ozone per hour.

A power switch (not shown) is located on the exterior of the ozone generator 40 for completely shutting down operation of the ozone generator 40. If desired, an indicator light (not shown) can be coupled to the power switch to indicate to a user that the high voltage is being supplied to the ozone cell 74 and the ozone cell 74 is, in fact, actively producing ozone. If the light is not illuminated, this indicates to the user that either the high voltage is discontinued or the ozone cell 74 is malfunctioning.

A variety of other electrical components, which assists with controlling the operation of the ozone generator, are also provided as part of the system 1. All of these electrical components are coupled to the computerized control box 20 of the system 1 in a conventional fashion to control operation thereof. As such other electrical components form no part per se the inventive aspect of the present invention, a further detailed description concerning the same is not provided.

In a preferred form of the invention, the pump, the venturi 32 and the conveying conduit 30 are supported by a single frame or structure. In addition, all of the components of the ozone generator are supported by a common framework or structure and this ozone generator common framework or structure is may be attached directly to a top or a side of the reservoir 4, e.g. attached directly to the washing machine, or mounted proximate to or spaced from the washing machine.

It is to be appreciated that there are a variety of different applications for the present invention. As noted above and shown in FIG. 8, the system, according to the present invention, can be coupled to a swimming pool to supply ozonated water thereto. The use of ozonated water in the swimming pool eliminates the need to add chlorine and/or other chemical disinfectants to the water of the swimming pool.

The Applicant has determined that it is very important to have an adequate mixing time, following application of the ozone to the liquid to be ozonated, to ensure that a substantially uniform mixture of the ozone and liquid results. This mixing time is typically between 5 to 40 seconds and more preferably between about 10 to about 20 seconds. To facilitate such adequate mixing time, it is generally achieved by having a desired length of conduit or other tubing to maintain the resulting mixture in a substantially uniform mixed state prior to discharging the ozonated liquid back into the reservoir 4.

According to the present invention, it is desirable to minimize the amount of moving parts of the system. Preferably, the mixing chamber 42 does not have any components which rotate or move. In a preferred form of the system, a plurality of screens 84 are employed. Alternatively, at least one or a plurality of baffles or other components can extend radially inwardly or outwardly so as to at least partially obstruct the passageway through the mixing chamber 42 and induce or cause the ozone/liquid mixture to flow in a serpentine or zigzag fashion through the mixing chamber 42 to facilitate adequate mixing. In all instances, the liquid/ozone mixture must pass either directly through or around the transverse extending barrier which restricts, obstructs, redirects and/or alters the flow of the liquid/ozone mixture through the mixing chamber 42.

The system is safeguarded so that the pump 24 and the ozone generator 40 can only be operated once the liquid level within the reservoir 4 is at a sufficient operating level, e.g. the reservoir is filled to a desired liquid level. In addition, the air flow rate through the air flow gage 72 is controlled to about 10 to about 20 cubic feet per hour.

Since certain changes may be made in the above described improved ozone generating system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

We claim:

1. A system for supplying ozone to a liquid containing a detergent for removing a contaminant from the detergent to facilitate cleansing and reuse of the detergent, the system comprising:

an ozone generator for generating ozone;

a reservoir for containing a quantity of the liquid containing the detergent;

a venturi for injecting the liquid containing the detergent with the generated ozone, the venturi having an inlet and an outlet with an orifice being located between the inlet and the outlet, and the ozone generator being coupled to the orifice for supplying the generated ozone thereto;

a pump, coupled to an outlet of the reservoir and to the inlet of the venturi, for pumping the liquid containing the detergent from the reservoir to the venturi;

the outlet of the venturi being connected to a return inlet of the reservoir for supplying the liquid containing the detergent and ozone back to the reservoir in a turbulent manner; and a mixing chamber coupling the outlet of the venturi to the return inlet of the reservoir, and the mixing chamber causing sufficient mixing of the ozone supplied to the liquid containing the detergent so as to facilitate substantially complete dissolving of any ozone bubbles and ozone pockets within the liquid containing the detergent to form a substantially uniform mixture of an ozonated liquid with the percentage of ozone in contact with the liquid containing the detergent to be in excess of about 60%.

2. The system for supplying ozone to a liquid according to claim 1, wherein the ozone generator comprises an ozone cell having an elongate inner tube spaced from an elongate outer tube by a pair of spaced apart O-rings, an exterior surface of the outer tube is covered with a conductive material which is coupled to a voltage source to supply an electrical voltage to the ozone cell, and an interior surface of the elongate outer tube, an exterior surface of the inner tube and the pair of spaced apart O-rings define an ozone cell cavity for generating ozone.

3. The system for supplying ozone to a liquid according to claim 1, wherein the pump includes a filter for filtering the liquid containing the detergent prior to pumping the liquid containing the detergent to the venturi.

4. The system for supplying ozone to a liquid according to claim 2, wherein the system is used in combination with a washing machine containing the reservoir, and the washing machine has a sump coupled to the outlet of the reservoir and the return inlet of the reservoir supplies the liquid containing the detergent and ozone to the reservoir.

5. The system for supplying ozone to a liquid according to claim 3, wherein the ozone generator comprises at least one drier for removing moisture from the air, and the at least one drier is connected to an ozone cell for supplying the dried air thereto and facilitating generation of ozone from the dried air.

6. The system for supplying ozone to a liquid according to claim 3, wherein the ozone generator comprises a pair of driers for removing moisture from the air and to increase an oxygen content of the air, and the pair of driers are connected to an ozone cell, via an air flow gauge, for supplying the dried air thereto and facilitating generation of ozone from the dried air, and a power supply is connected to the ozone generator to supply a voltage to the ozone cell and facilitate the generation of ozone.

7. The system for supplying ozone to a liquid according to claim 1, wherein the mixing chamber comprises an elongate chamber having an inlet and an outlet, the mixing chamber supports a plurality of baffles which induce a serpentine flow path within the mixing chamber and facilitate mixing of the ozone within the liquid containing the detergent to be ozonated so as to increase the percentage of the ozone dissolved within the liquid and in contact with the detergent to be in excess of about 80%.

8. The system for supplying ozone to a liquid according to claim 1, wherein the mixing chamber comprises an elongate chamber having an inlet and an outlet, the mixing chamber supports at least one pair of rotatable propeller blades within the mixing chamber, a first one of the pair of rotatable blades rotates in a first direction and a second one of the pair of rotatable blades rotates in the opposite direction, and the pair of rotatable blades enhances mixing of the ozone within the liquid containing the detergent so as to increase the percentage of the ozone dissolved within the liquid and in contact with the detergent to be in excess of about 80%.

9. The system for supplying ozone to a liquid according to claim 1, wherein the mixing chamber comprises an elongate chamber having an inlet and an outlet, the mixing chamber supports at least one screen extending transversely across a diameter of the mixing chamber, and the at least one screen enhances mixing of the ozone within the liquid containing the detergent so as to increase the percentage of the ozone dissolved within the liquid and in contact with the detergent to be in excess of about 80 percent.

10. The system for supplying ozone to a liquid according to claim 1, wherein the mixing chamber comprises an elongate chamber having an inlet and an outlet, the mixing chamber supports at least one static mixer within the mixing chamber, the at least one static mixer enhances mixing of the ozone within the liquid containing the detergent so as to increase the percentage of the ozone dissolved within the liquid and in contact with the detergent to be in excess of about 80%.

11. The system for supplying ozone to a liquid according to claim 1, wherein the reservoir communicates with a sump and the sump is connected to a sewer, via a drainage conduit, to facilitate discarding of all of the liquid contained within the reservoir following completion of a cycle of the system; and the reservoir is connected to a fresh liquid source for supplying fresh liquid to the reservoir to supply further liquid for a next cycle of the system.

12. The system for supplying ozone to a liquid according to claim 7, wherein each of the baffles has a width of about 4 inches and a thickness of about 1 inch.

13. The system for supplying ozone to a liquid according to claim 1, wherein the mixing chamber includes an obstruction which reduces the transverse cross-sectional area of the mixing chamber by at least 30 percent and the transverse obstruction increases the percentage of the ozone dissolved within the liquid and in contact with the detergent to be in excess of about 80 percent.

14. The system for supplying ozone to a liquid according to claim 1, wherein the system further includes a control box for controlling operation of the pump, the ozone generator, a supply of fresh liquid to the reservoir to be ozonated and the discard of spent liquid from the reservoir.

15. The system for supplying ozone to a liquid according to claim 6, wherein each of the pair of driers comprises a tube drier having an inlet and an outlet, each tube drier includes a heater for supplying heat to evaporate any moisture removed from the air and a thermostat for controlling a temperature of the heater during operation of the tube drier, and an outlet of each one of the tube driers is connected to an air valve for controlling the flow of the air to an ozone cell of the ozone generator.

16. A system for supplying ozone to a liquid containing a detergent for removing a contaminant from the detergent to facilitate cleansing and reuse of the detergent, the system comprising:

an ozone generator for generating ozone;

a washing machine having a reservoir for containing a quantity of liquid containing the detergent;

a venturi for injecting the liquid containing the detergent with the generated ozone, the venturi having an inlet and an outlet with an orifice being located between the inlet and the outlet, and the ozone generator being coupled to the orifice for supplying the generated ozone thereto;

a pump, coupled to an outlet of the reservoir and to the inlet of the venturi, for pumping the liquid containing the detergent from the reservoir to the venturi, and the pump includes a filter for filtering the liquid containing the detergent prior to pumping the liquid containing the detergent to the venturi;

the outlet of the venturi being connected to a return inlet of the reservoir by a return conduit for supplying the liquid containing the detergent and ozone back to the reservoir in a turbulent manner;

a mixing chamber coupling the outlet of the venturi to the return conduit, and the mixing chamber and the return conduit causing sufficient mixing of the ozone supplied to the liquid containing the detergent to facilitate dissolving of any ozone bubbles and ozone pockets within the liquid containing the detergent to form a substantially uniform mixture of an ozonated liquid with the percentage of ozone in contact with the liquid containing the detergent to be in excess of about 60%;

the washing machine having a sump coupled to the outlet of the reservoir and the return inlet of the reservoir supplies the liquid containing the detergent and the ozone to the reservoir; and the ozone generator comprising at least one drier for removing moisture from the air, and the at least one drier is connected to an ozone cell for supplying the dried air thereto and facilitating generation of ozone from the dried air.

17. The system for supplying ozone to a liquid according to claim 16, wherein the ozone generator comprises a pair of driers for removing moisture from the air and to increase an oxygen content of the air, and the pair of driers are connected to an ozone cell, via an air flow gauge, for supplying the dried air thereto and facilitating generation of ozone from the dried air, and a power supply is connected to the ozone generator to supply a voltage to the ozone cell and facilitate the generation of ozone.

18. The system for supplying ozone to a liquid according to claim 16, wherein the mixing chamber comprises an elongate chamber having an inlet and an outlet, the mixing chamber supports a plurality of baffles which induce a serpentine flow path of the liquid containing the detergent within the mixing chamber and facilitate mixing of the ozone within the liquid containing the detergent so as to increase the percentage of the ozone dissolved and in contact with the detergent to be in excess of about 80%.

19. The system for supplying ozone to a liquid according to claim 16, wherein the mixing chamber comprises an elongate chamber having an inlet and an outlet, the mixing chamber supports at least one screen extending transversely across a diameter of the mixing chamber, and the at least one screen enhances mixing of the ozone within the liquid containing the detergent and increases the percentage of the ozone dissolved within the liquid and in contact with the detergent to be in excess of about 80%.

20. A method of supplying ozone to a liquid containing a detergent for removing a contaminant from the detergent to facilitate cleansing and reuse of the detergent, said method comprising the steps of:

generating ozone with an ozone generator;

providing a reservoir for containing a quantity of the liquid containing the detergent;

providing a venturi having an inlet and an outlet with an orifice being located between the inlet and the outlet, coupling the ozone generator to an orifice of the venturi for supplying the generated ozone thereto and injecting the liquid containing the detergent with the generated ozone via the orifice of the venture;

coupling a pump to an outlet of the reservoir and to the inlet of the venturi for pumping liquid containing the detergent from the reservoir to the venturi;

connecting the outlet of the venturi to a return inlet of the reservoir for supplying the liquid containing the detergent and ozone back to the reservoir in a turbulent fashion; and coupling a mixing chamber to the outlet of the venturi to the return inlet of the reservoir, and causing sufficient mixing, within the mixing chamber, to facilitate dissolving of any ozone bubbles and ozone pockets within the liquid containing the detergent to form a substantially uniform mixture of an ozonated liquid with the percentage of ozone in contact with the liquid containing the detergent to be in excess of about 60%.

* * * * *